United States Patent
Tiszai

[11] Patent Number: 6,029,653
[45] Date of Patent: Feb. 29, 2000

[54] INDUCED DRAFT HEAT EXCHANGER WITH SERPENTINE BAFFLES

[75] Inventor: Joseph J. Tiszai, Fairfield, Ohio

[73] Assignee: Henny Penny Corporation, Eaton, Ohio

[21] Appl. No.: 09/063,042

[22] Filed: Apr. 21, 1998

Related U.S. Application Data

[60] Provisional application No. 60/045,950, May 8, 1997.

[51] Int. Cl.[7] .................................................. A47J 37/12
[52] U.S. Cl. .......................... 126/391; 126/360 R; 99/403
[58] Field of Search ...................... 126/391, 390, 126/360 R, 378, 110 R; 99/403; 165/142, 169

[56] References Cited

U.S. PATENT DOCUMENTS

| | | |
|---|---|---|
| D. 336,007 | 6/1993 | King et al. . |
| 2,176,869 | 10/1939 | Childs . |
| 2,645,278 | 7/1953 | Holthouse, Sr. et al. .......... 126/110 R |
| 2,655,144 | 10/1953 | Keating . |
| 2,840,436 | 6/1958 | Mason . |
| 3,060,922 | 10/1962 | Wilson .................................... 126/391 |
| 3,701,313 | 10/1972 | Boggs . |
| 3,970,072 | 7/1976 | Chipchase .............................. 126/391 |
| 3,990,433 | 11/1976 | Keating . |
| 4,602,612 | 7/1986 | Schwizer . |
| 4,751,915 | 6/1988 | Price . |
| 4,848,317 | 7/1989 | Prudhomme et al. . |
| 4,913,038 | 4/1990 | Burkett et al. . |
| 4,930,408 | 6/1990 | King et al. . |
| 5,033,368 | 7/1991 | Brewer . |
| 5,038,753 | 8/1991 | Yokoyama et al. . |
| 5,050,582 | 9/1991 | Almond et al. . |
| 5,060,559 | 10/1991 | Winter . |
| 5,094,224 | 3/1992 | Diesch . |
| 5,215,075 | 6/1993 | Caridis et al. . |
| 5,232,151 | 8/1993 | Mercer et al. . |
| 5,253,566 | 10/1993 | McCabe et al. ........................ 126/391 |
| 5,261,322 | 11/1993 | Yokoyama et al. . |
| 5,398,597 | 3/1995 | Jones et al. . |
| 5,402,712 | 4/1995 | King et al. . |
| 5,402,713 | 4/1995 | King . |
| 5,417,202 | 5/1995 | Cote . |
| 5,528,018 | 6/1996 | Burkett et al. . |
| 5,540,215 | 7/1996 | Fritzsche et al. . |
| 5,577,438 | 11/1996 | Amitrano et al. . |
| 5,611,330 | 3/1997 | Corliss et al. . |
| 5,617,776 | 4/1997 | King et al. . |

*Primary Examiner*—Ira S. Lazarus
*Assistant Examiner*—Sara Clarke
*Attorney, Agent, or Firm*—Baker & Botts, L.L.P.

[57] ABSTRACT

A cooking system including a vessel having a first end, a second end, and a pair of opposing side walls and containing a cooking medium. A first heat exchanger tube has an outer wall and extends through the vessel from the first end to the second end. The first heat exchanger tube has a first inlet in the first end and a first outlet in the second end. The first heat exchanger tube also includes a combustion gas director tube, a first upper passage, and a first lower passage, wherein the director tube is joined to the first inlet and directs combustion gas into the upper passage and the upper passage is in communication with the lower passage. An upper transition baffle is placed in the first upper passage to smoothly direct combustion gases from the director tube into the first upper passage. Similarly, a communication passage is formed between the first upper passage and the first lower passage, and a lower transition baffle is placed in the communication passage to smoothly direct combustion gases from the first upper passage to the first lower passage. A burner introduces combustion gases into the upper passage through the first inlet, and air enter the upper passage through a gap between the burner and the first inlet to ensure the laminar flow of the combustion gases. A second heat exchanger tube is in contact with one of the opposing side walls outside of the vessel. The second heat exchanger includes a second upper passage and a second lower passage, such that the second lower passage is in communication with the second upper passage. A collection chamber receives the combustion gases from the first lower passage through the first outlet. The collection chamber includes a collection chamber divider which directs the combustion gases into the second lower passage through a second outlet. The combustion gases reenter the collection chamber from the second upper passage through a second inlet.

14 Claims, 10 Drawing Sheets

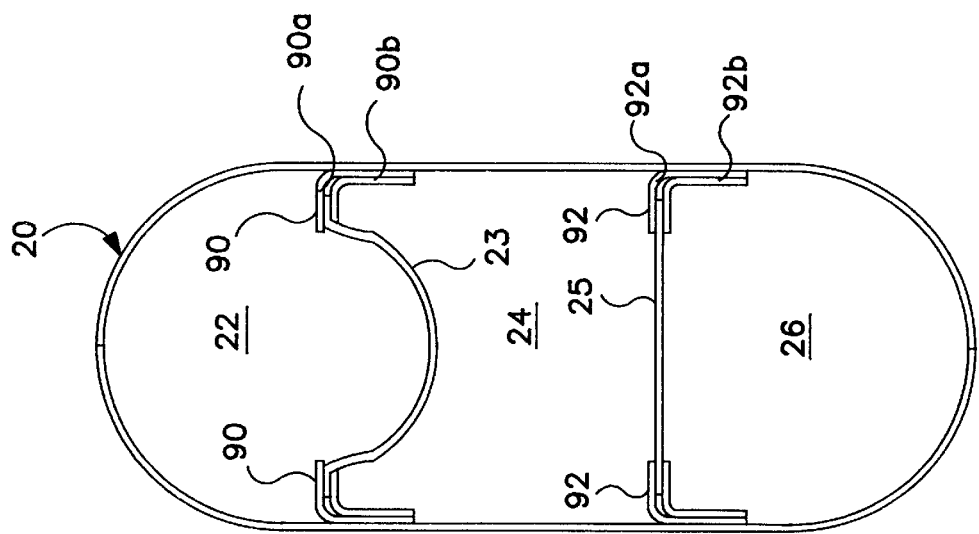
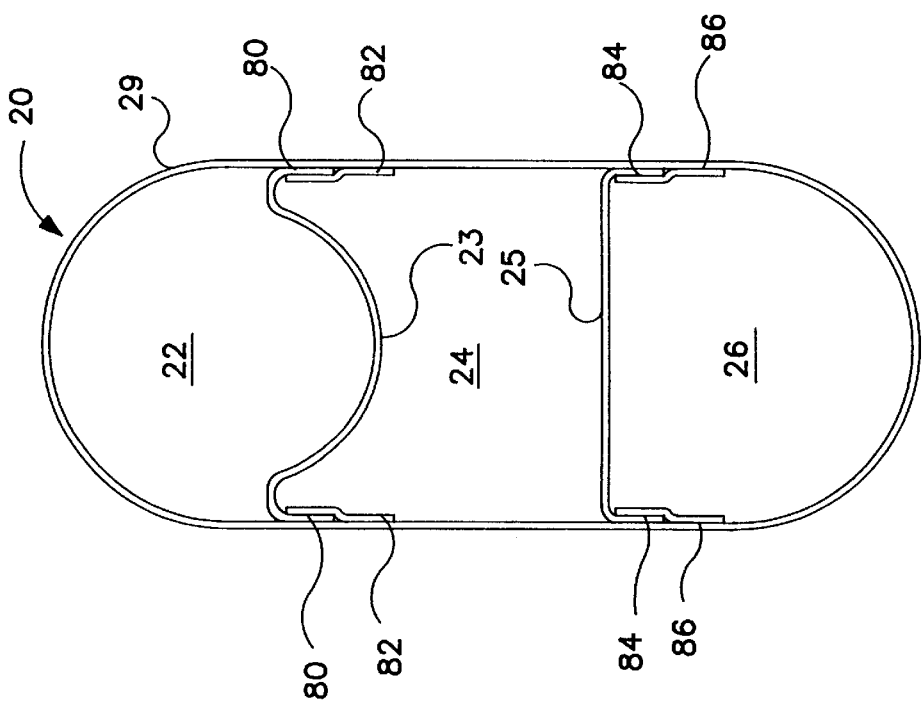

INDUCED DRAFT HEAT EXCHANGER WITH SERPENTINE BAFFLES

This application claims benefit of provisional application Ser. No. 60/045,950, filed May 8, 1997.

BACKGROUND OF THE INVENTION

1. Field of the Invention

The invention relates to a cooking system such as an induced draft, open fryer system, in which a burner is fired into a heat exchanger tube, from which heat is transferred to a cooking medium, such as shortening or oil, contained in a fryer vessel. More particularly, the invention relates to a cooking system including a heat exchanger tube having a substantially oval cross-section, wherein combustion gases are drawn through the heat exchanger tube to make multiple passes through a fryer vessel.

2. Description of the Related Art

Deep fat fryers, or gas fryers, are commercially used by restaurants, institutional kitchens, and fast food establishments for cooking a variety of food products, such as french fries, fish, fried chicken, and the like. Food products are cooked by immersing it within a vessel or pot that is filled with a heated cooking medium. The cooking medium may be heated using a flow of heated gas that is forced or drawn through flow passages that are in thermal communication with wall portions of the cooking vessel or are disposed within the vessel itself in order to increase the heat transfer to the cooking oil. In either case, however, maintaining a uniform temperature throughout a cooking zone of the cooking medium remains a difficult task.

In known cooking systems, a gas burner may force air into a plurality of parallel passages within the cooking medium to heat the cooking medium to the desired temperature, with the air forced out through the rear of the cooking system. The walls of a combustion chamber absorb heat from the combustion gases by heat radiation and convection. Several disadvantages are encountered with this type of cooking system. Such systems have a low thermal efficiency because the combustion gases are forced through the cooking system and do not remain in thermal contact with the cooking medium for a sufficient amount of time. In addition, because the combustion gases exit the rear of the cooking system, the combustion gases pass quickly through the system, and complete heat transfer is not achieved.

SUMMARY OF THE INVENTION

A need has arisen for an induced draft, open fryer cooking system that efficiently transfers heat from internal and external heat exchanger tubes to a cooking medium, such as shortening or oil, contained in a fryer vessel. An object of the system is to ensure sufficient heat transfer area to achieve a sufficiently high heat transfer rate while maintaining predetermined cooking medium capacity and fryer vessel dimensions. The system employs a substantially serpentine flow path within the heat exchanger tubes, which may be established by a serpentine baffling structure, to create multiple combustion gas passes, e.g. a triple pass, through the cooking substance inside at least one, substantially oval-shaped, heat exchanger tube. Thus, the "dwell" time of hot combustion gases inside such heat exchanger tubes is increased.

It is another object of this invention to create a laminar flow of the combustion gases into a heat exchanger tube. It is an advantage of such a laminar flow that the combustion gases flow efficiently and completely into the heat exchanger tube. It is a feature of this invention that each burner is located at the front surface of a fryer vessel and is fired into a heat exchanger tube that is loosely coupled to the burner. In particular, a gap may be created between the burner and the burner inlet of the heat exchanger tube. The burners are fired through a burner inlet and a secondary air flow is drawn through such a gap into the heat exchanger tube and around the flame, thus ensuring laminar flow of the air, flame, and combustion gases. Consequently, the system achieves superior combustion and heat transfer results.

In an embodiment of the invention, a cooking system comprises a vessel having a first end, a second end, and at least one side wall. The vessel contains a cooking medium, such as shortening, cooking oil, or the like. At least one first heat exchanger tube has an outer wall and extends through the vessel from the first end to the second end. The at least one first heat exchanger tube may have a substantially oval cross-section. Further, the at least one first heat exchanger tube has a first inlet in the first end and a first outlet in the second end. The at least one first heat exchanger tube also includes a first upper passage, a middle passage, and a first lower passage, wherein the upper passage is in communication with the middle passage, and the middle passage is in communication with the lower passage. At least one burner introduces combustion gases, e.g., gases generated by the combustion of natural gas, into the first upper passage through the first inlet. At least one second heat exchanger tube is in thermal contact with the at least one side wall outside of the vessel, and the at least one second heat exchanger tube includes a second upper passage and a second lower passage, such that the second lower passage is in communication with the second upper passage. A collection chamber receives combustion gases exiting the first lower passage through the first outlet, and the collection chamber includes at least one collection chamber divider means for directing the combustion gases into the second lower passage through a second outlet. The collection chamber also has a second inlet, through which the combustion gases reenter the collection chamber from the second upper passage.

In another embodiment, the first upper passage, the middle passage, and the first lower passage of each first heat exchanger tube are formed by a first upper baffle that is mounted on an interior surface of the outer wall of the first heat exchanger tube and extends from the first end toward the second end and a first lower baffle that is mounted on the inner surface of the outer wall and extends from the second end toward the first end. An upper communication passage is formed between the first upper passage and the middle passage, and an upper transition baffle is placed in the upper communication passage to smoothly, e. g., without creating flow disrupting turbulence, direct combustion gases from the first upper passage to the middle passage. Similarly, a middle communication passage is formed between the middle passage and the first lower passage, and a middle transition baffle is placed in the middle communication passage to smoothly direct combustion gases from the middle passage to the first lower passage.

The first upper baffle also may have a pair of mounting arms, and the interior surface of the outer wall has a pair of upper mounting brackets, each of the upper mounting brackets receiving one of the mounting arms of the first upper baffle, thereby mounting the first upper baffle on the interior surface of the outer wall. Similarly, the first lower baffle may also have a pair of securing arms, and the interior surface of the outer wall has a pair of lower mounting brackets, each of the lower mounting brackets receiving one of the mounting arms of the first lower baffle, thereby mounting the first upper baffle on the interior surface of the outer wall. Alternatively, the interior surface of the outer wall may have a pair of upper receiving slots for receiving the first upper baffle, thereby mounting the first upper baffle on the interior surface of the outer wall and the interior surface of the outer wall has a pair of lower receiving slots for receiving the first lower baffle, thereby mounting the first upper baffle on the interior surface of the outer wall. In addition, the at least one second heat exchanger tube may have at least one second baffle dividing the at least one second heat exchanger tube into the second upper passage and the second lower passage.

These first upper and lower baffles may be removably mounted on the interior surface of the outer wall, e.g., to a bulkhead plate. Further, all baffles preferably are made from a heat resistant material selected from a group consisting of Incoloy 800, stainless steel 309/310, or a similar heat resistant material.

In still another embodiment, the collection chamber's divider means may include a diversion or impingement plate that directs the combustion gases exiting the at least one first heat exchanger tube into the second lower passage of the at least one second heat exchanger tube through a second outlet in the collection chamber. The divider means also may direct the combustion gases reentering the collection chamber through a second inlet from the second upper passage into a dilution chamber. The dilution chamber may include a plurality of ventilation openings, wherein the combustion gases mix with ambient air, e.g., air external to the cooling system and at an ambient temperature, and are cooled. In addition, the cooling system may comprise a blower having a blower inlet in communication with the dilution chamber for drawing the combustion gases through the at least one heat exchanger tube. This blower may deliver the cooled combustion gases through a blower outlet to an exhaust passage.

In a further embodiment of the invention, a cooking system comprises a vessel having a first end, a second end, and at least one side wall. The vessel contains a cooking medium, such as shortening, cooking oil, or the like. At least one first heat exchanger tube has an outer wall and extends through the vessel from the first end to the second end. The at least one first heat exchanger tube may have a substantially oval cross-section. Further, the at least one first heat exchanger tube has a first inlet in the first end and a first outlet in the second end. The at least one first heat exchanger tube also includes a first upper passage and a first lower passage, wherein the upper passage is in communication the lower passage. At least one burner introduces combustion gases, e.g., gases generated by the combustion of natural gas, into a combustion gas director tube mounted on the first inlet in the first end and extending through the first upper passage toward the second end. At least one second heat exchanger tube is in thermal contact with the at least one side wall outside of the vessel, and the at least one second heat exchanger tube includes a second upper passage and a second lower passage, such that the second lower passage is in communication with the second upper passage. A collection chamber receives combustion gases exiting the first lower passage through the first outlet, and the collection chamber includes at least one collection chamber divider means for directing the combustion gases into the second lower passage through a second outlet. The collection chamber also has a second inlet, through which the combustion gases reenter the collection chamber from the second upper passage.

In still a further embodiment, the first upper passage and the first lower passage of each first heat exchanger tube are formed by a separating baffle that is mounted on the inner surface of the outer wall and extends from the second end toward the first end. An upper transition baffle is placed adjacent to said second end in said first upper passage to smoothly direct said combustion gases exiting the combustion gas director tube around the combustion gas director tube and toward the first end. An upper communication passage is formed between the first upper passage and the first lower passage, and an lower transition baffle is placed in the upper communication passage to smoothly direct combustion gases from the first upper passage to the first lower passage.

The separating baffle may be mounted on the second end and may extend through the first heat exchanger tube toward the first end. The separating baffle also may be secured on the interior surface of the outer wall or it may be suspended from the second end and offset from the interior surface of the outer wall. Thus, a thermal expansion gap may be formed between each side of the separating baffle and the interior surface of the outer wall. Although gaps may exist between the separating baffle and the interior surface of the outer wall, substantially all of the combustion gases are directed by the separating baffle and flow of combustion gases through the thermal expansion gaps is minimal.

Further, all baffles preferably are made from a heat resistant material selected from a group consisting of Incoloy 800, stainless steel 309/310, or a similar heat resistant material.

In yet a further embodiment, the collection chamber's divider means may include a diversion or impingement plate that directs the combustion gases exiting the at least one first heat exchanger tube into the second lower passage of the at least one second heat exchanger tube through a second outlet in the collection chamber. The divider means also may direct the combustion gases reentering the collection chamber through a second inlet from the second upper passage into a blower. The blower may have a blower inlet in communication with the collection chamber for drawing the combustion gases through the at least one heat exchanger tube. This blower may deliver the combustion gases through a blower outlet to an exhaust passage. Further, the blower may be connected to said collector box, such that a gap is created therebetween. This gap may extend around the periphery or around a portion of the periphery of the blower inlet and may be formed by placing a plurality of spacers between the blower inlet and a collector box outlet. This dilution gap permits combustion gases exiting the collector box to mix with ambient air, e.g., air external to the cooking system and at an ambient temperature, and to be cooled.

The cooking system of the foregoing embodiments may further comprise an air flow gap between the at least one burner and the first inlet to permit laminar flow of air into the first heat exchanger tube and around the combustion gases.

Further objects, features, and advantages of this invention will be understood from the following detailed description of preferred embodiments with reference to the attached drawings.

BRIEF DESCRIPTION OF THE DRAWINGS

For a more complete understanding of the present invention, the needs satisfied thereby, and the features and advantages thereof reference now is made to the following descriptions taken in connection with the accompanying drawings, briefly described below.

FIGS. 6A and 6B are cross-sectional views of two embodiments of the first heat exchanger tubes of FIG. 4.

DETAILED DESCRIPTION OF PREFERRED EMBODIMENTS

Preferred embodiments of the present invention and their advantages are best understood by referring to FIGS. 1–11, like numerals being used for like corresponding parts in the various drawings.

In a preferred embodiment, the cooking system comprises a vessel having a first end, a second end, and a pair of opposing side walls. The vessel contains a cooking medium, such as shortening, cooking oil, or the like. A pair of first heat exchanger tubes, each having an outer wall, extend through the vessel from the first end to the second end. Each heat exchanger tube also has a first inlet in the first end and a first outlet in the second end.

Each of the pair of first heat exchanger tubes includes a first upper passage, a middle passage, and a first lower passage, wherein the upper passage is in communication with the middle passage and the middle passage is in communication with the lower passage. The system further includes a pair of burners, and one of the burners introduces combustion gases into the upper passage through the first inlet of each of the first heat exchanger tubes.

Each of a pair of second heat exchanger tube is in thermal contact with one of the pair of opposing side walls of the vessel. Each second heat exchanger tube includes a second upper passage and a second lower passage, such that the second lower passage is in communication with the second upper passage. A collection chamber receives the combustion gases from the first lower passages through the first outlets. The collection chamber includes collection chamber divider means for directing the combustion gases into the second lower passages through a pair of second outlets. The collection chamber also has a pair of second inlets, through which the combustion gases reenter the collection chamber from the second upper passages.

Figure 1:
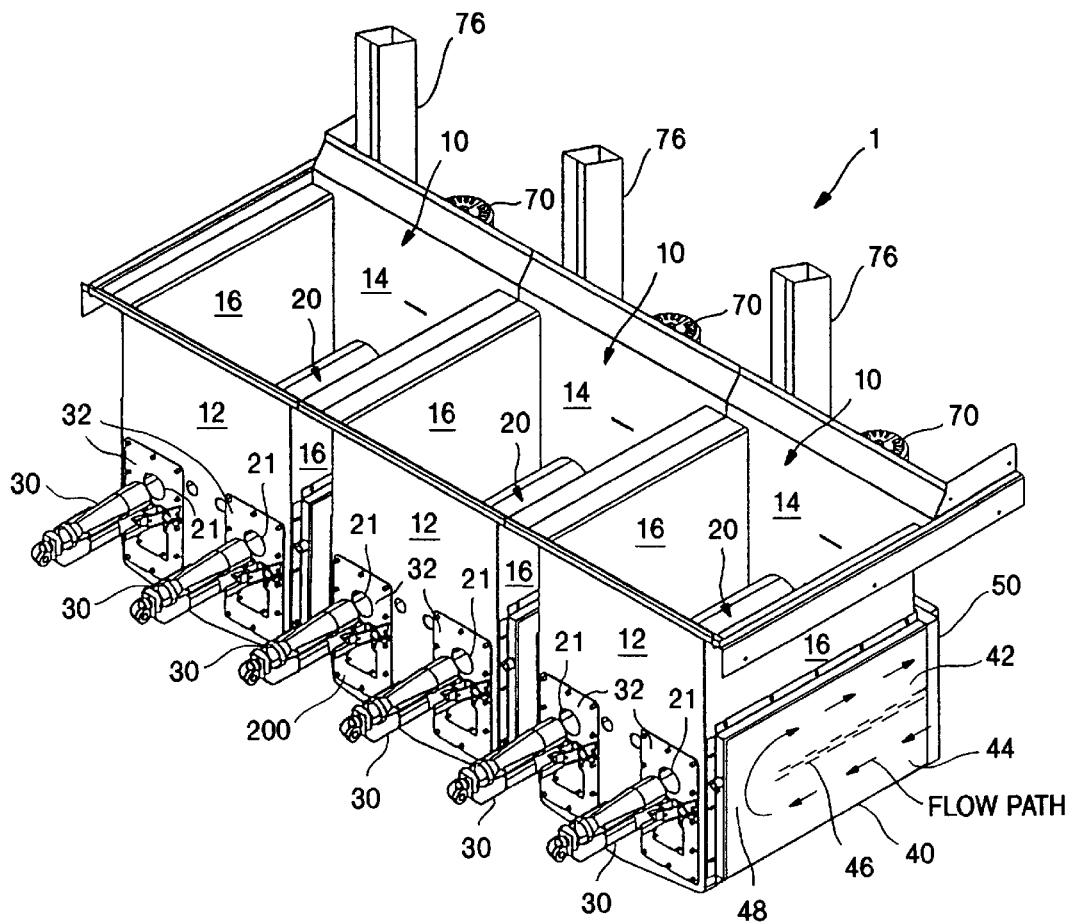
FIG. 1 is a perspective, front view of a three fryer vessel cooking system, wherein each fryer vessel has two first heat exchanger tubes and wherein each tube is equipped with a burner. The flow of combustion gases through a second heat exchanger tube is depicted. Each second heat exchanger tube conducts combustion gases from the first heat exchanger tubes along a side wall of the fryer vessel.

Referring to FIG. 1, an open fryer system 1 is depicted which includes three fryer vessels 10, each having two first heat exchanger tubes 20. As depicted in FIGS. 6A and 6B, each heat exchanger tube comprises three, vertically stacked combustion gas passages 22, 24, and 26, and each tube having a substantially oval cross-section. Fryer vessel 10 has a first end 12, a second end 14, and a pair of opposing side walls 16. Each first heat exchanger tube 20 receives combustion gases from a burner 30 through a first inlet 21 in a front bulkhead plate 200. Each fryer vessel 10 has a pair of second heat exchanger tubes 40 which receive combustion gases from the first lower passage 26 of the first heat exchanger tubes 20 at second end 14 of fryer vessel 10 through a first outlet 27.

Each second heat exchanger tube 40 comprises a second upper passage 42 and a second lower passage 44 formed by a second baffle 46 extending from second end 14 toward first end 12. Second upper passage 42 communicates with second lower passage 44 through a second heat exchanger communication path 48. Referring again to FIG. 1, the flow path of combustion gases from second lower passage 44 to second upper passage 42 is depicted by arrows.

Figure 2:
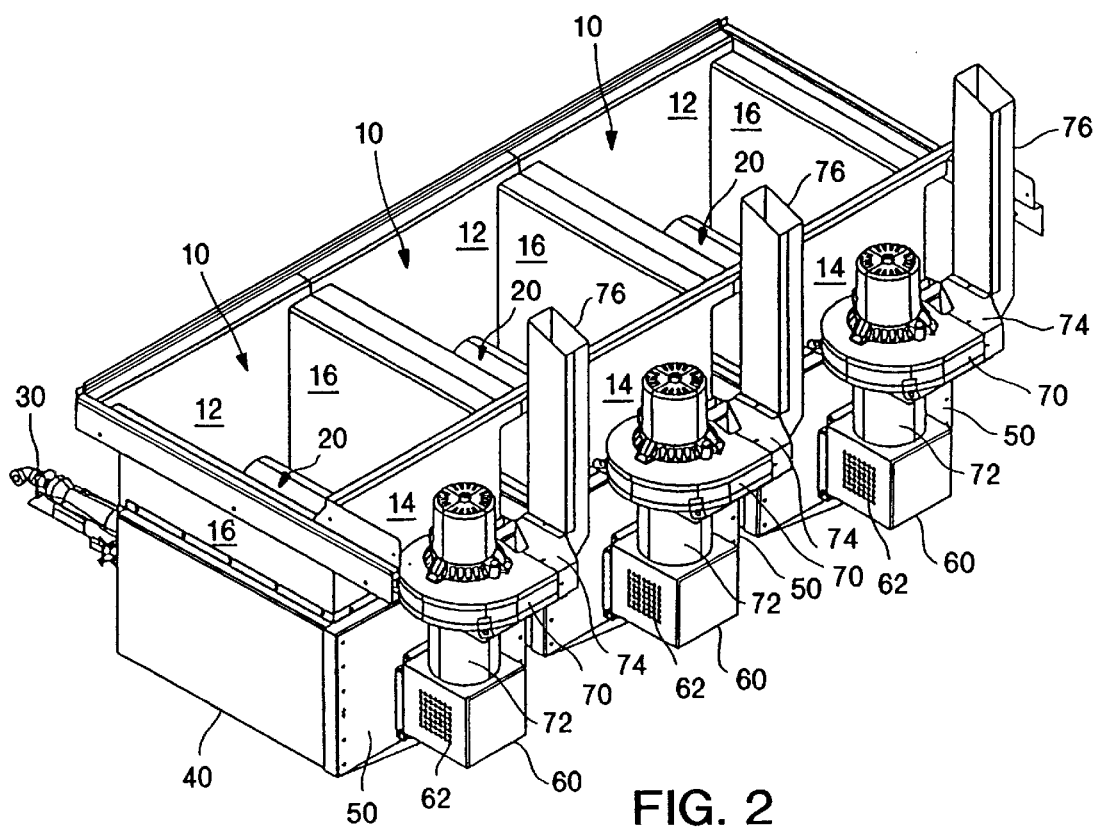
FIG. 2 is a perspective, rear view of the three fryer vessel cooking system of FIG. 1, wherein each fryer vessel has a blower in communication with a dilution box and a exhaust passage to draw combustion gases through that fryer vessel's first and second heat exchanger tubes.
Figure 3:
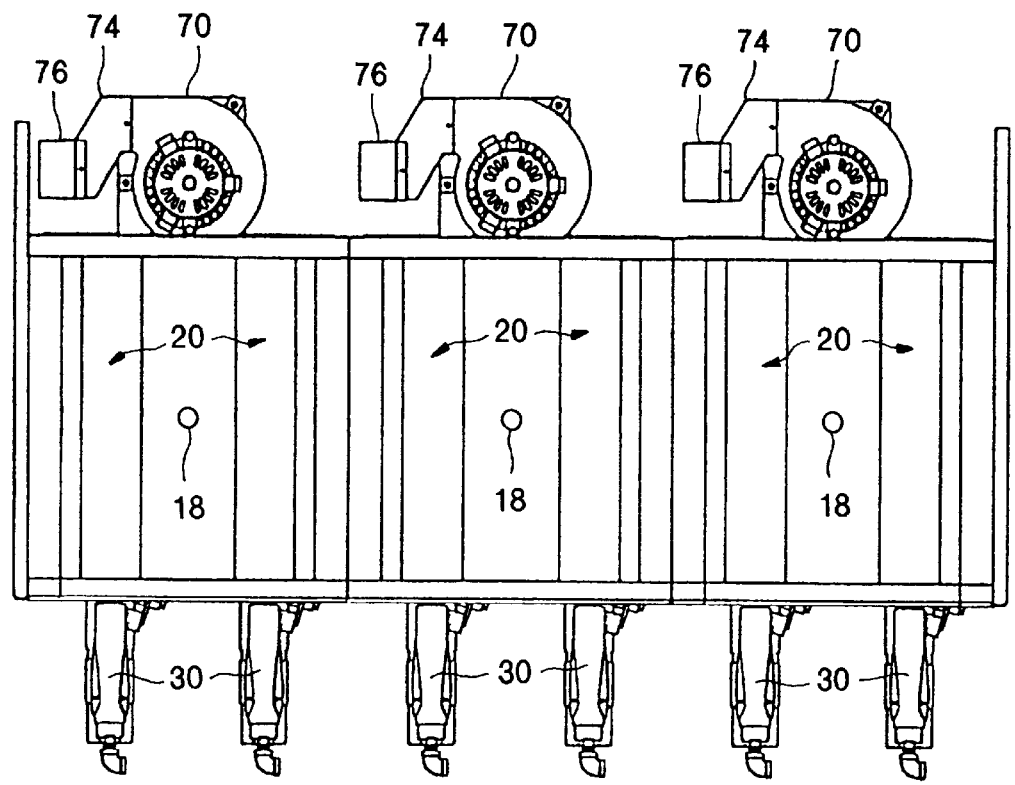
FIG. 3 is an overhead view of the three fryer vessel cooking system of FIG. 1.

Referring to FIGS. 2 and 3, a blower 70 is located at second end 14 of each fryer vessel 10 to draw combustion gases through first and second heat exchanger tubes 20 and 40, respectively, into a collection chamber 50 and to vent the combustion gases from a dilution chamber 60 to an exhaust passage 76. Dilution chamber 60 has a plurality of ventilation openings 62. Air at ambient temperature from outside of cooking system 1 is drawn through ventilation openings 62 by blower 70 and mixed with combustion gases from collection chamber 50. The combustion gases are cooled by this mixing before entering blower 70 through blower inlet 72. The cooled combustion gases are exhausted from blower 70 to exhaust passage 76 through a blower outlet 74. FIG. 3 is an overhead view of the three fryer vessel cooking system of FIG. 1, and also depicts the a fryer vessel drain 18 through which the cooking medium may be drained from fryer vessel 10.

Figure 4:
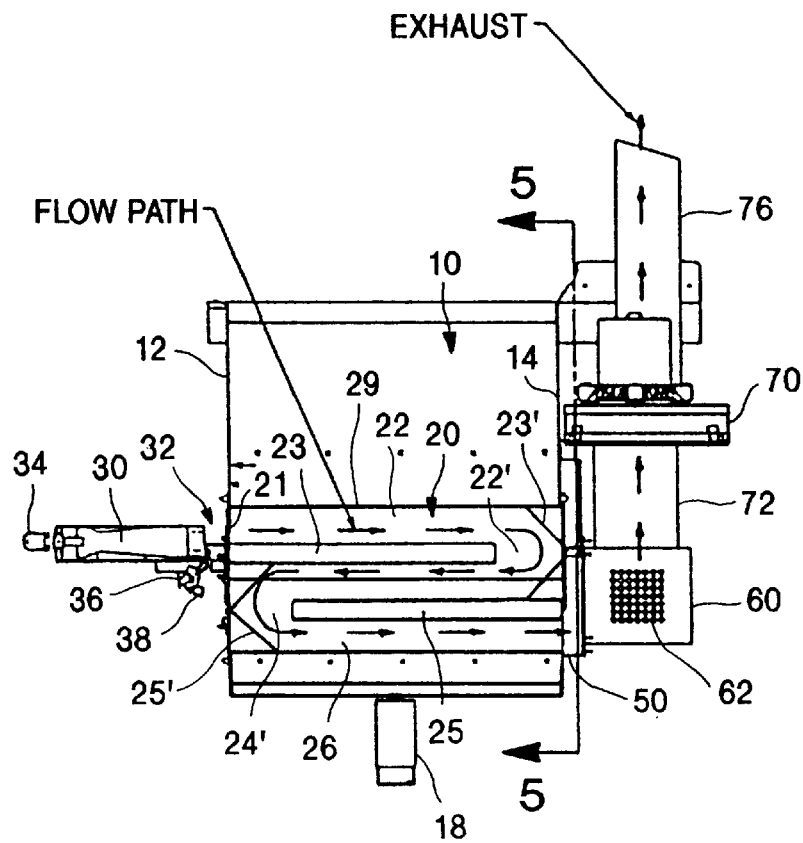
FIG. 4 is a cut-away, side view of the three fryer vessel cooking system of FIG. 1, depicting the flow of combustion gases through a first embodiment of the first heat exchanger tube.

Referring to FIG. 4, each first heat exchanger tube 20 has a first upper passage 22, a middle passage 24, and a first lower passage 26. First upper passage 22 is formed by an first upper baffle 23, which extends from first end 12 toward second end 14 and is mounted on an outer wall 29 of first heat exchanger 20. Middle passage 24 and first lower passage 26 are formed by first lower baffle 25, which extends from second end 14 toward first end 12 and is mounted on an outer wall 29 of first heat exchanger 20. First upper passage 22 is in communication with middle passage 24 through a upper communication passage 22', which is located proximately to second end 14 and between first upper passage 22 and middle passage 24. Middle passage 24 is in communication with first lower passage 26 through a middle communication passage 24', which is located proximately to first end 12 and between middle passage 24 and first lower passage 26. An upper transition baffle 23', e.g., a V-shaped plate made from a heat resistant material, is placed in upper communication passage 22' to smoothly direct combustion gases from first upper passage 22 to middle passage 24. Similarly, a middle transition baffle 25', e.g., a V-shaped plate made from a heat resistant material, is placed in middle communication passage 24' to smoothly direct combustion gases from middle passage 24 to first lower passage 26.

The first upper and lower baffles and the transition baffles may combine to cause the combustion gases to make three passes through the fryer vessel 10 in first heat exchanger tubes 20. The flow path of the combustion gases through first heat exchanger 20 is again depicted by arrows. Because of the high temperature of the combustion gases, preferably, the first upper and lower baffles are removable for cleaning, repair, or replacement and may be made of a heat resistant material, such as Incoloy 800 alloy, stainless steel 309/310, or a similar heat resistant metal.

As noted above, the combustion gases are generated by burners 30 which are coupled to first heat exchanger tubes 20 at their first upper passages 22. The combustion gases enter first heat exchanger tubes 20 at first end 12 of fryer vessel 10 and exit from first lower passage 26 to collection chamber 50 at second end 14 of fryer vessel 10. A gap 32 in a range of about 1 to 1.5 cm is created between burner 30 and first inlet 21 of each first heat exchanger tube 20, so that secondary air may be drawn into first upper passage 22 and may create a laminar flow around the burner flame and combustion gases. Burner 30 has a gas inlet orifice 34, through which gas is supplied to burner 30; a pilot assembly 36 for igniting the burner flame; and a flame detector 38 for confirming burner ignition.

Figure 5:
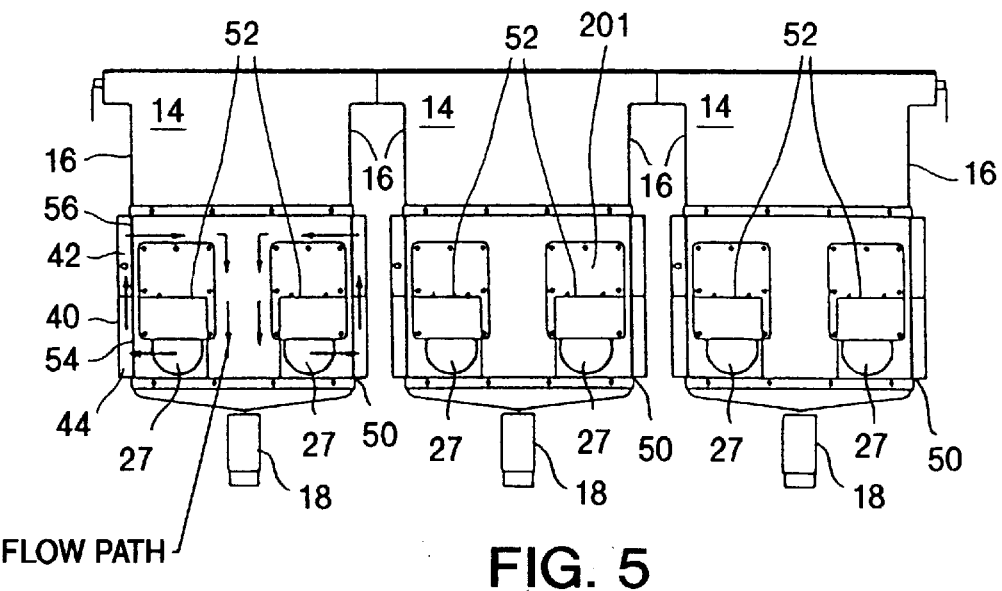
FIG. 5 is a cut-away, rear view of the three fryer vessel cooking system of FIG. 4 along line 5—5, depicting the flow path of the combustion gases exiting the first and second heat exchanger tubes.

Referring to FIG. 5, the combustion gases exit first heat exchanger tubes 20 and enter collection chamber 50 through first outlets 27 in a rear bulkhead plate 201. The combustion gases entering collection chamber 50 from first heat exchanger tubes 20 are deflected by L-shaped collection chamber dividers 52 and enter second lower passage 44 from collection chamber 50 through second outlet 54. The combustion gases flow into second upper passage 42 through second heat exchanger communication path 48 and exit second heat exchanger tube 40 and reenter collection chamber 50 through second inlet 56. L-shaped collection chamber dividers 52 then combine to act as a funnel, directing combustion gases reentering collection chamber 50 into dilution chamber 60.

Referring again to FIGS. 6A and 6B, first heat exchanger tubes 20 have a substantially oval cross-section. FIG. 6A depicts first upper baffle 23 having a pair of upper mounting arms 80. A corresponding pair of upper mounting brackets 82 are secured to the interior surface of outer wall 29, so that they may receive upper mounting arms 80. First upper baffles 23 are bowed, so that the baffles do not interfere with the laminar flow of the combustion gases into first upper passages 22. First lower baffle 25 has a pair of lower mounting arms 84. A corresponding pair of lower mounting brackets 86 are secured to the interior surface of outer wall 29, so that they may receive upper mounting arms 84. Upper mounting arms 80 of first upper baffles 23 and lower mounting arms 84 of first lower baffles 25 may be fixedly or removably mounted in mounting brackets 82 and 86, respectively.

FIG. 6B depicts a pair of upper receiving slots 90 secured to the interior surface of outer wall 29. Slots 90 receive the opposite ends of first upper baffles 23. Similarly, a pair of lower receiving slots 92 are secured to the interior surface of outer wall 29, and slots 92 receive the opposite ends of first lower baffles 25. For example, each of slots 90 and 92 may be formed by two nested L-shaped plates 90a and b and 92a and b offset from each other by a distance equal to the thickness of first upper baffle 23 or first lower baffle 25. Upper and first lower baffles 23 and 25 again may be fixedly or removably mounted in slots 90 and 92, respectively.

Figure 7:
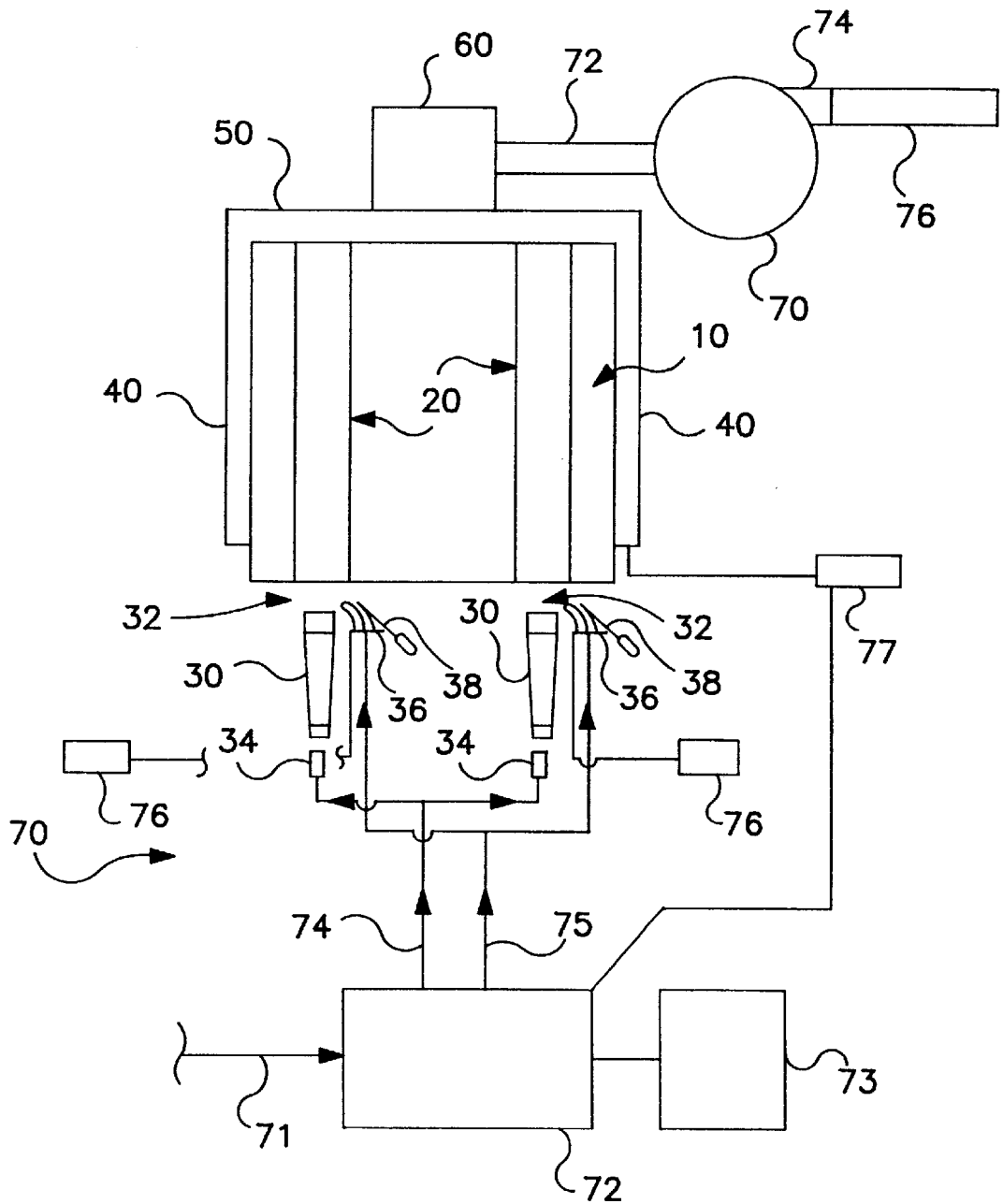
FIG. 7 is a block diagram of the burner control elements of an embodiment of the cooking system.

FIG. 7 is a block diagram of the burner control elements of an embodiment of the cooking system. A burner control assembly 70 comprises a main gas line 71 which delivers a combination gas valve 72. The operation of gas valve 72 is controlled by a vessel temperature regulating device 73 which receives input from temperature sensors (not shown) in the control system vessel 10. Gas valve 72 controls the flow of gas to a burner gas supply line 74 and to a pilot gas supply line 75.

Burner gas supply line 74 is linked to gas inlet orifices 34, and pilot gas supply line 75 is linked to pilot assembly 36 which is used for igniting the burner flame. Ignition of each burner 30 is controlled by an ignition module 76, and burner ignition is confirmed by a flame detector 38. In addition, a pressure sensor 77 measures the atmospheric pressure within second heat exchanger tube 40. If the atmospheric pressure falls outside of a predetermined range of values, gas valve 72 terminates gas flow to burner gas supply line 74.

Figure 8:
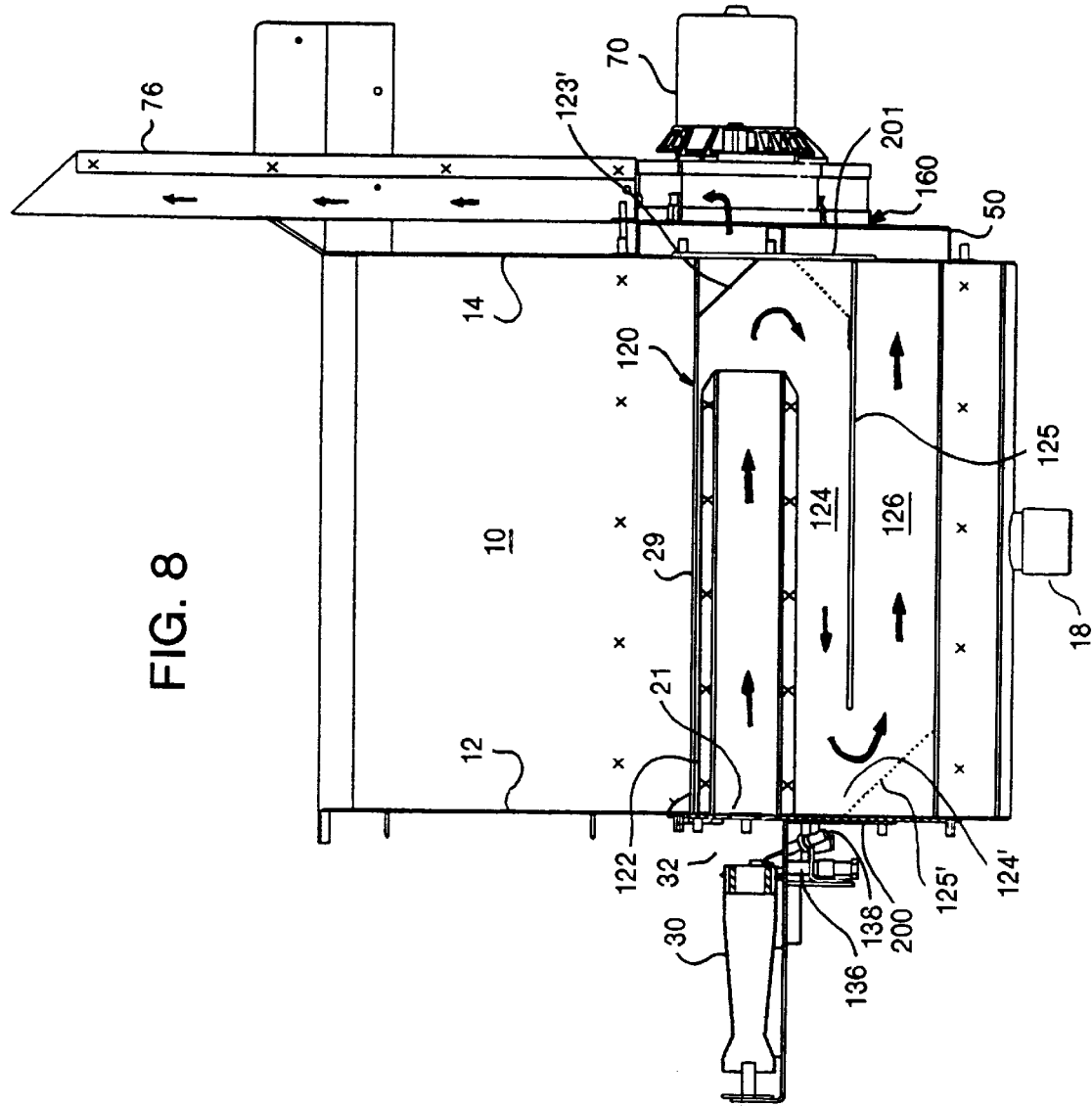
FIG. 8 is a cut-away, side view of a fryer vessel cooking system, depicting the structure and the flow path of combustion gases through a second embodiment of the first heat exchanger tube.

Referring to FIG. 8, each first heat exchanger tube 120 has a combustion gas director tube 122, a first upper passage 124, and a first lower passage 126. Combustion gas director tube 122 is attached to a front bulkhead plate 200 at first end 12 and extends from first end 12 toward second end 14. Director tube 122 may be mounted on an outer wall 29 of first heat exchanger 20. First upper passage 124 and first lower passage 126 are formed by separating baffle 125, which extends from second end 14 toward first end 12 and is mounted on an outer wall 29 of first heat exchanger 120. Combustion gasses enter first heat exchanger tube 120 through combustion gas director tube 122 and empty into first upper passage 124 proximately to second end 14. Because combustion gas director tube 122 is contained completely within first upper passage 124, combustion gas flow around the exterior of director tube 122 may flow between director tube 122 and outer wall 29 of first heat exchanger 120. First upper passage 124 is in communication with first lower passage 126 through an upper communication passage 124', which is located proximately to first end 12 and between first upper passage 124 and first lower passage 126. An upper transition baffle 123', e.g. a V-shaped plate made from a heat resistant material, is placed in at second end 14 of first upper passage 124, proximately to the outlet of combustion gas director tube 122, to smoothly direct combustion gases from combustion gas director tube 122 into first upper passage 124 and in the direction of first end 12. Similarly, a upper transition baffle 125', e.g., a V-shaped plate made from a heat resistant material, is placed in upper communication passage 124' to smoothly direct combustion gases from first upper passage 124 to first lower passage 126.

The first upper baffle and the transition baffles may combine to cause the combustion gases to make three passes through the fryer vessel 10 in first heat exchanger tubes 120. The flow path of the combustion gases through first heat exchanger 120 is again depicted by arrows. Because of the high temperature of the combustion gases, preferably, the first upper baffle is removable for cleaning, repair, or replacement and may be made of a heat resistant material, such as Incoloy 800 alloy, stainless steel 309/310, or a similar heat resistant metal.

As noted above, the combustion gases are generated by burners 30 which are coupled to first heat exchanger tubes 120 at their combustion gas director tubes 122. The combustion gases enter first heat exchanger tubes 120 at first end 12 of fryer vessel 10 and exit from first lower passage 26 to collection chamber 50 at second end 14 of fryer vessel 10. A gap 32 in a range of about 1 to about 1.5 cm is created between burner 30 and first inlet 21 of each first heat exchanger tube 20, so that secondary air may be drawn into combustion gas director tube 122 and may create a laminar flow around the burner flame and combustion gases. Burner 30 has a gas inlet orifice 34, through which gas is supplied to burner 30. A pilot assembly 36 for igniting the burner flame is depicted in FIG. 7, and an alternative pilot assembly 136 is depicted in FIG. 10; and a flame detector 38 is also depicted for confining burner ignition.

Figure 9:
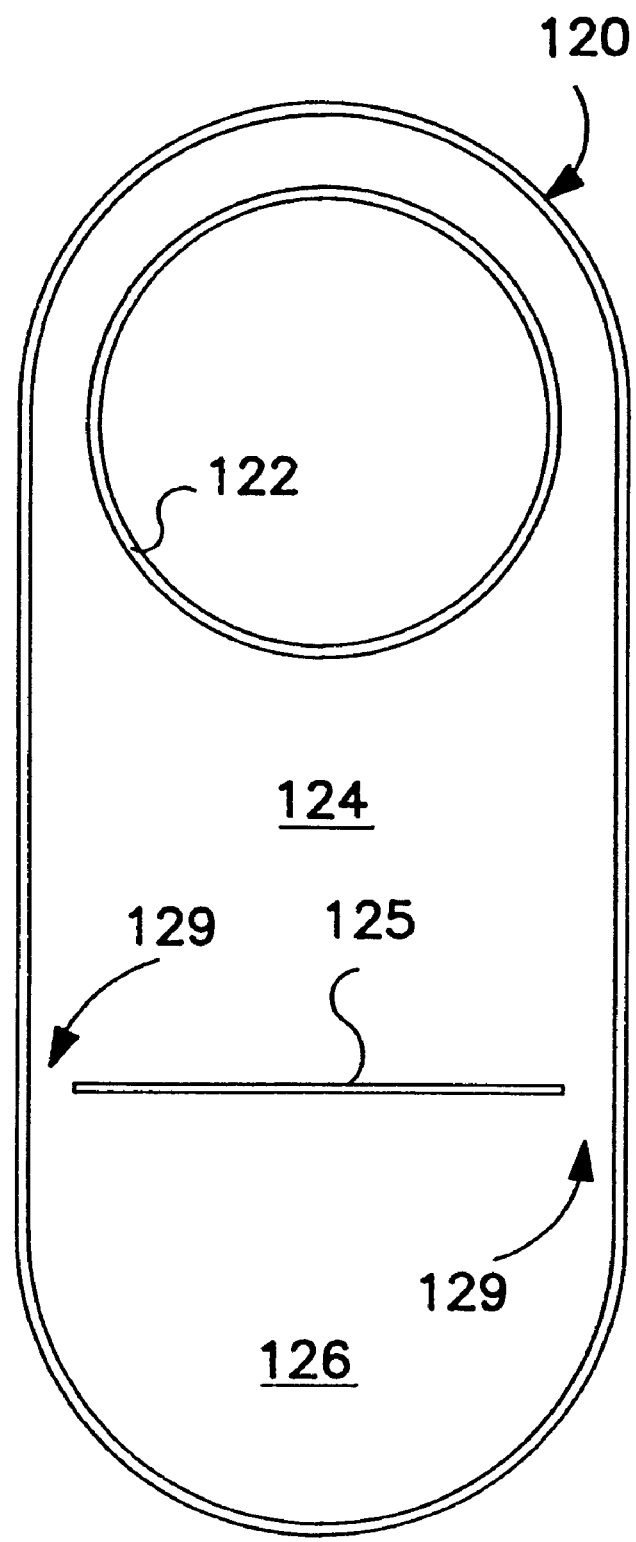
FIG. 9 is a cross-sectional view of the first heat exchanger tube of FIG. 8.

As depicted in FIG. 9, each heat exchanger tube comprises three, vertically stacked combustion gas passages: combustion gas director tube 122 and first upper and lower passages 124 and 126, respectively, and each tube having a substantially oval cross-section. FIG. 9 depicts a cross-sectional view of combustion gas director tube 122 and separating baffle 125. Separating baffle 125 is secured to second end 14 and extends toward first end 12. Separating baffle may be suspended within first heat exchanger tube 120, such that is does not contact the interior surface of outer wall 29. Moreover, thermal expansion gaps 129 may be formed between separating baffle 125 and the interior surface of outer wall 29 to prevent damage to first heat exchanger tube 120 due to differing rates and amounts of thermal expansion during heating.

Figure 10:
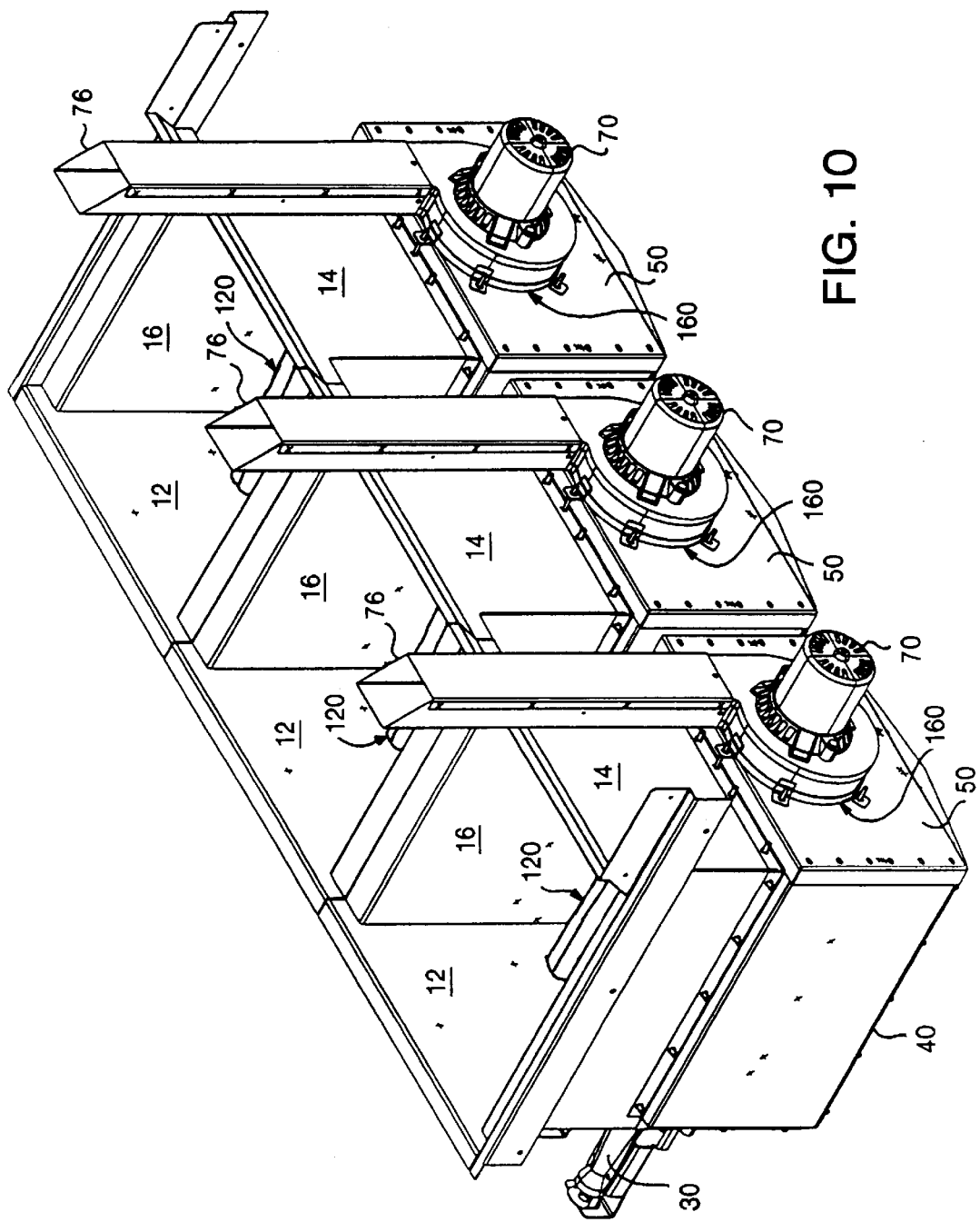
FIG. 10 is a perspective, rear view of a three fryer vessel cooking system, wherein each fryer vessel has a blower in communication with a collector box and a exhaust passage to draw combustion gases through that fryer vessel's first and second heat exchanger tubes.

Referring to FIG. 10, a blower 70 is located at second end 14 of each fryer vessel 10 to draw combustion gases through first and second heat exchanger tubes 120 and 40, respectively, into a collection chamber 50 and to vent the combustion gases to an exhaust passage 76. A dilution gap 160 is formed between collection chamber 50 and the inlet side of blower 70, for example by placing spacers (not shown) or washers (not shown) on fasteners used to connect collection chamber 50 to the inlet side of blower 70 Air at ambient temperature from outside of cooling system 1 is drawn through dilution gap 160 by blower 70 and mixed with combustion gases from collection chamber 50. The combustion gases are cooled by this mixing before entering blower 70 through blower inlet 72. The cooled combustion gases are exhausted from blower 70 to exhaust passage 76 through a blower outlet 74.

Figure 11:
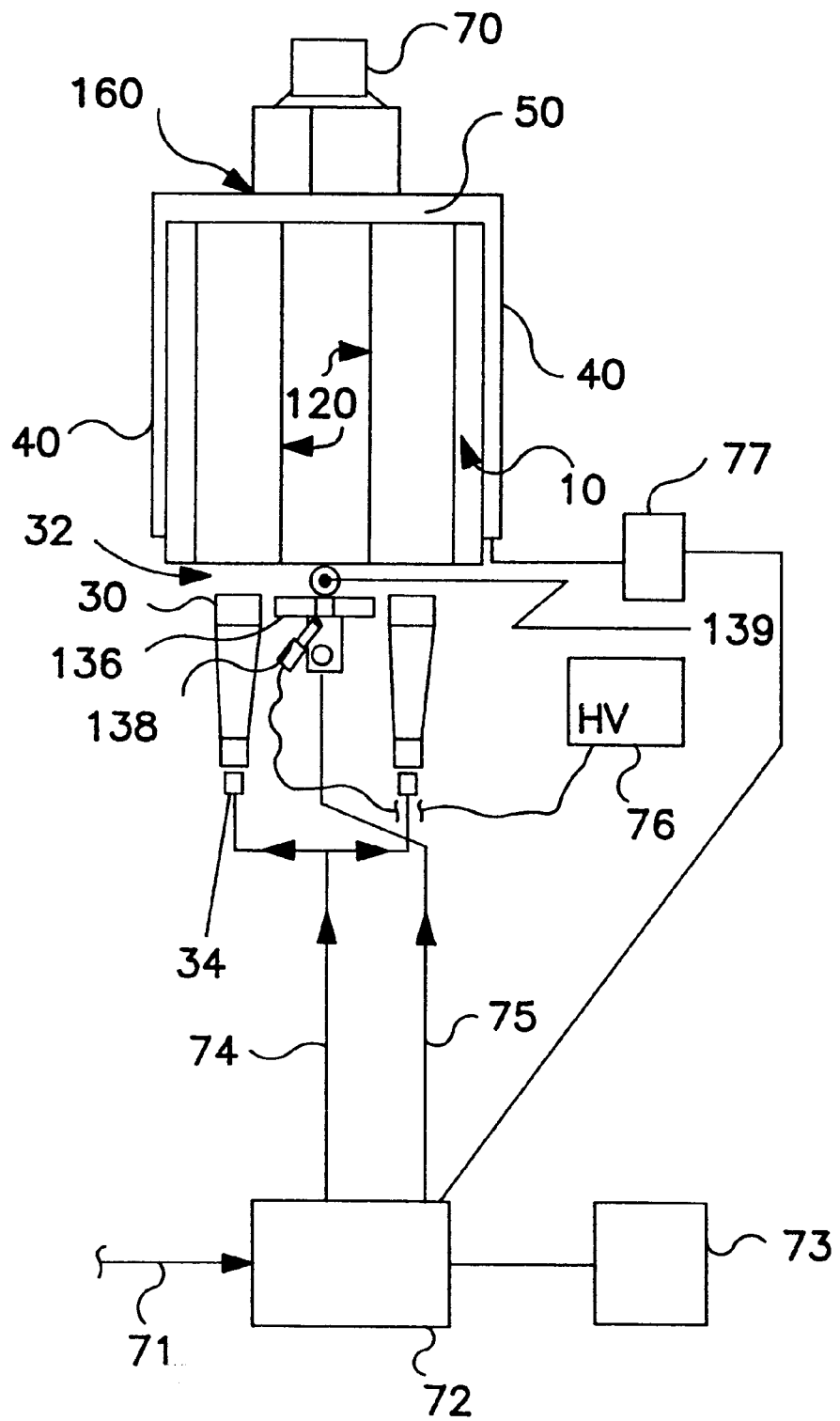
FIG. 11 is a block diagram of the burner control elements of an alternative embodiment of the cooking system.

FIG. 11 is a block diagram of the burner control elements of an alternative embodiment of the cooking system. A burner control assembly 70 comprises a main gas line 71 which delivers a combination gas valve 72. The operation of gas valve 72 is controlled by a vessel temperature regulating device 73 which receives input from temperature sensors (not shown) in the control system vessel 10. Gas valve 72 controls the flow of gas to a burner gas supply line 74 and to a pilot gas supply line 75.

Burner gas supply line 74 is linked to gas inlet orifices 34, and pilot gas supply line 75 is linked to pilot assembly 136 including an igniter 138, which is positioned between burners 30 and is used for igniting the burner flame. Ignition of each burner 30 is controlled by an ignition module 76, and burner ignition is confirmed by a single flame detector 139, positioned between burners 30. In addition, a pressure sensor 77 measures the atmospheric pressure within second heat exchanger tube 40. If the atmospheric pressure falls outside of a predetermined range of values, gas valve 72 terminates gas flow to burner gas supply line 74.

Although the present invention has been described in connection with preferred embodiments, the invention is not limited thereto. It will be understood by those of ordinary skill in the art that variations and modifications may be made within the scope of this invention as defined by the following claims.

I claim:

1. A cooking system comprising:
   a vessel having a first end, a second end, and at least one side wall, said vessel containing a cooking medium;
   at least one first heat exchanger tube having an outer wall, extending through said vessel from said first end to said second end, and having a first inlet in said first end and a first outlet in said second end;
   said at least one first heat exchanger tube having a multi-pass flow structure and including a combustion gas director tube, a first upper passage, and a first lower passage, wherein said director tube extends from said first inlet into said upper passage and toward said second end, said director tube having an outlet that is proximate said second end, and said upper passage is in communication with said lower passage;
   at least one burner for introducing combustion gases into said director tube through said first inlet;
   at least one second heat exchanger tube in thermal contact with said at least one side wall outside of said vessel, said at least one second heat exchanger including a second upper passage and a second lower passage, such that said second lower passage is in communication with said second upper passage;
   a collection chamber for receiving said combustion gases from said first lower passage through said first outlet, said collection chamber including at least one second outlet, at least one collection chamber divider means for directing said combustion gases into said at least one second lower passage through said at least one second outlet, and at least one second inlet, through which said combustion gases reenter said collection chamber from said at least one second upper passage.

2. The cooking system of claim 1, further comprising an upper transition baffle placed to smoothly direct combustion gases from said director tube into said upper passage; and an upper communication passage formed between said upper passage and said lower passage, and a lower transition baffle is placed in the upper communication passage to smoothly direct combustion gases from said upper passage to said lower passage.

3. The cooking system of claim 1, wherein said first upper passage and said first lower passage are formed by a separating baffle that is mounted on said second end and extends from said second end toward said first end.

4. The cooking system of claim 3, wherein said separating baffle is suspended within said first heat exchanger tube and a thermal expansion gap is formed between said separating baffle and said interior surface of said outer wall.

5. The cooking system of claim 3, wherein said separating baffle is removably mounted on said interior surface of said outer wall.

6. The cooking system of claim 3, wherein said baffles are made from a heat resistant material selected from the group consisting of Incoloy 800 and stainless steel 309/310.

7. The cooking system of claim 1, wherein said divider means directs said combustion gases reentering said collection chamber from said at least one second upper passage through said at least one second inlet into a blower.

8. The cooking system of claim 7, wherein a dilution gap is formed between said collection chamber and said blower, wherein ambient air is drawn through said dilution gap and said combustion gases mix with ambient air and cool.

9. The cooking system of claim 8, wherein said blower has a blower inlet in communication with said collection chamber for drawing said combustion gases through said at least one heat exchanger tube.

10. The cooking system of claim 9, wherein said blower delivers said cooled combustion gases through a blower outlet to an exhaust passage.

11. The cooking system of claim 1, wherein said at least one second heat exchanger tube has at least one second baffle dividing said at least one second heat exchanger tube into said second upper passage and said second lower passage.

12. The cooking system of claim 1 further comprising an axial air flow gap between said at least one burner and said inlet to permit laminar flow of air around said combustion gases.

13. The cooking system of claim 1, wherein said at least one first heat exchanger tube has a substantially oval cross-section.

14. A cooking system comprising:
- a vessel having a first end, a second end, and a pair of opposing side walls, said vessel containing a cooking medium;
- at pair of first heat exchanger tubes, each having an outer wall, extending through said vessel from said first end to said second end, and having a first inlet in said first end and a first outlet in said second end;
- each of said pair of first heat exchanger tubes having a multi-pass flow structure and including a combustion gas director tube, a first upper passage, and a first lower passage, wherein said director tube extends from said first inlet into said upper passage and toward said second end, said director tube having an outlet that is proximate said second end, and said upper passage is in communication with said lower passage;
- a pair of burners, each of said burners introducing combustion gases into one of said director tubes through said first inlet of one of said first heat exchanger tubes;
- a pair of second heat exchanger tubes, each of which is in thermal contact with one of said pair of opposing side walls of said vessel said vessel and each of which includes a second upper passage and a second lower passage, such that said second lower passage is in communication with said second upper passage;
- a collection chamber for receiving said combustion gases from said first lower passages through said first outlets, said collection chamber including a pair of second outlets, collection chamber divider means for directing said combustion gases into said second lower passages through said pair of second outlets, and a pair of second inlets, through which said combustion gases reenter said collection chamber from said second upper passages.

* * * * *